United States Patent [19]
Edagawa et al.

[11] Patent Number: 5,808,789
[45] Date of Patent: Sep. 15, 1998

[54] OPTICALLY AMPLIFYING TRANSMISSION SYSTEM

[75] Inventors: Noboru Edagawa; Hidenori Taga; Masatoshi Suzuki; Itsuro Morita; Shu Yamamoto; Shigeyuki Akiba, all of Tokyo, Japan

[73] Assignee: Kokusai Denshin Denwa Kabushiki Kaisha, Tokyo, Japan

[21] Appl. No.: 873,568

[22] Filed: Jun. 12, 1997

[30] Foreign Application Priority Data

Jun. 12, 1996 [JP] Japan ................................. 8-150547

[51] Int. Cl.⁶ .............................. G02B 6/26; H04B 3/14
[52] U.S. Cl. ............................................. 359/341; 359/337
[58] Field of Search .................... 359/337, 341; 372/6

[56] References Cited

U.S. PATENT DOCUMENTS 5,039,199  8/1991  Mollenauer et al. .................... 359/341
5,058,974 10/1991  Mollenauer ................................ 385/24
5,117,303  5/1992  Desurvire et al. ....................... 359/337
5,253,104 10/1993  Delavaux ................................. 359/174
5,430,572  7/1995  DiGiovanni et al. .................... 359/341

OTHER PUBLICATIONS

Erbium–Doped Fiber Amplifiers by Desurvire, E.; John Wiley & Sons Pub., 1994, pp. 480–487.
Giles et al, IEEE Photonics Tech. Lett., vol. 2, #12, Dec. 1990, pp. 866–868.

*Primary Examiner*—Nelson Moskowitz
*Attorney, Agent, or Firm*—Christie, Parker & Hale, LLP

[57] ABSTRACT

An optically amplifying transmission system available for wider signal bands includes an optical transmission line 42 divided into two sections 42a and 42b, optically amplifying repeaters 48a having 7 m-long erbium-doped optical fibers to repeat transmission optical fibers 46a in the section 42a, and optically amplifying repeaters 48b having 10.8 m-long erbium-doped optical fibers to repeat transmission optical fibers 46b in the section 42b. The transmission optical fibers 46a an 46b are optical fibers absolutely identical in construction and length.

22 Claims, 5 Drawing Sheets

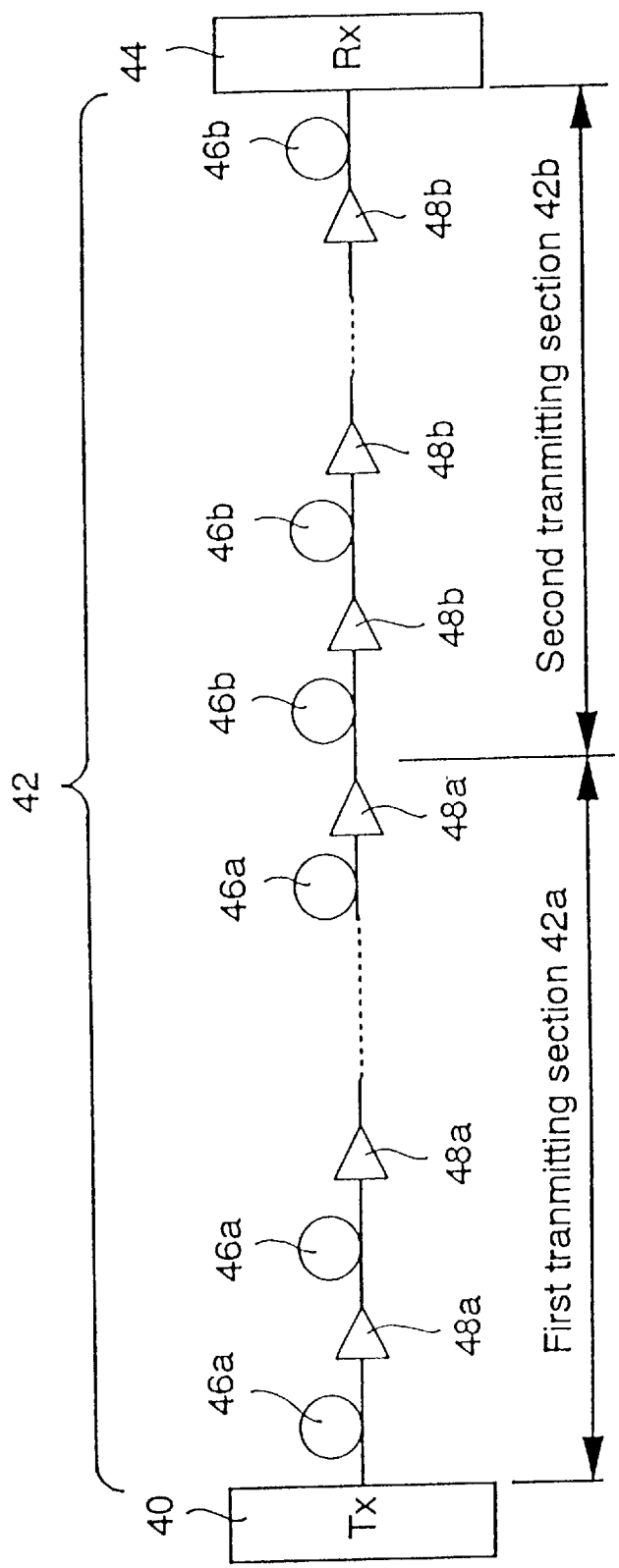

OPTICALLY AMPLIFYING TRANSMISSION SYSTEM

BACKGROUND OF THE INVENTION

1. Field of the invention

This invention relates to an optically amplifying transmission system and, more particularly, to such a system for amplifying and repeating optical signals by using a number of optically amplifying fibers.

2. Prior art

In a long-distance optical transmission system, optically amplifying repeaters must be used between terminals to amplify optical signals. As shown in FIG. 3, a system is made by serially connecting transmission optical fibers 14, 14, . . . . Of a predetermined length (for example, 20 km to 40 km) via optically amplifying repeaters 16, 16, . . . . To form optical transmission lines connecting an optical transmitter terminal 10 and an optical receiver terminal 12. Typically used as the optical amplifying repeater 16 is an erbium-doped optical fiber amplifier having a less loss at the connection to the transmission optical fiber 14 and amplifying optical signals as themselves. The erbium-doped optical fiber amplifier has favorable properties, i.e. High gain and wide band.

It was a common belief that repeaters of absolutely identical characteristics be used in a repeating transmission system. Actually, conventional systems even of an optically amplifying and repeating type, used erbium-doped optical fiber amplifiers of absolutely identical characteristics as optically amplifying repeaters 16, 16, 16 . . . .

FIG. 4 shows a general construction of the optically amplifying repeater output from a pumping LD (laser diode) module 24 is fed to an erbium-doped optical fiber 20 via a WDM (Wavelength Division Multiplex) coupler 22 to excite the erbium-doped optical fiber 20. Located downstream of the WDM coupler 22 is an optical isolator 26 for interrupting reflective light from later the stages.

The conventional erbium-doped optical fiber amplifier, however, involves some problems. Namely, its gain wavelength characteristics are not flat in the band of 1,550 nm remarked in wavelength-division-multiplex systems, and cause the optical signal level to vary as the number of repeaters increases. This is one of factors narrowing the effective wavelength band. That is, it disturbs the availability of the wavelength-division-multiplex systems for wider bands. Additionally, a large absorption occurs typically in the band of 1,530 nm, and decreases the signal gain in the band of 1,550 nm.

Short erbium-doped optical fibers, in general, exhibit relatively flat gain wavelength characteristics in the band of 1,550 nm remarked in wavelength-division-multiplex systems, although depending on the composition of glass and its dopant. However, they cause an increase noises in the band of 1,530 nm and a decrease in signal gain in the band of 1,550 nm. Therefore, it is difficult to reliably obtain an acceptable signal gain with short erbium-doped optical fibers. In contrast, long erbium-doped optical fibers decrease noises in the band of 1,530 nm, but exhibit gain wavelength characteristics acutely cresting in the band of 1,550 nm, and therefore narrows the available signal band.

FIG. 5 schematically shows gain wavelength characteristics when waves of four different wavelengths in the band of 1,550 nm are multiplexed and repeated at multiple points. FIG. 5(a) shows characteristics of a system using optically amplifying repeaters having long erbium-doped optical fibers. FIG. 5(b) shows characteristics of a system using optically amplifying repeaters having short erbium-doped optical fibers.

When individual signal wavelengths are different in level in wavelength-division multiplex systems, low level signals cannot ensure a desired S/N ratio, and high level signals are apt to be affected by nonlinear distortion.

In optical soliton transmission which is based on that signals be held at a predetermined level, fibers causing fluctuation in level of individual signal wavelengths cannot make use of advantages of optical soliton transmission.

As reviewed above, prior art techniques cannot make use of available signal wavelength bands of transmission optical fibers.

OBJECT AND SUMMARY OF THE INVENTION

It is therefore an object of the invention to provide an optically amplifying transmission system overcoming the problems of prior techniques and enabling the use of wider signal wavelength bands.

In the present invention, at least one first optically amplifying fiber and at least one second optically amplifying fiber longer than the first optically amplifying fiber as means for repeating transmission optical fibers for transmitting optical signals, and uses a larger number of first optically amplifying fibers than the second optically amplifying fibers. The first and second optically amplifying fibers may be, for example, rare earth doped optically amplifying fibers.

Short optically amplifying fibers, in general, improve the flatness in a predetermined signal wavelength band, but decreases the signal gain. In contrast, long optically amplifying fibers degrade the flatness in a predetermined signal wavelength band, but provide high signal gains. It is true even when estimating them in terms of absorption loss when the optically amplifying fibers are not excited.

In the present invention, such the optically amplifying means having two types of characteristics are combined to use and the number of the first optically amplifying means is larger than that of the second optically amplifying means. By this arrangement, the flatness and the necessary gain in the predetermined signal band are achieved.

The first and second optically amplifying means may be, for example, rare earth doped optically amplifying fibers.

When the first and second optically amplifying means are disposed continuously, that is, to localize the first optically amplifying means alone over a span and the second optically amplifying means over another span, their maintenance is made easy.

When the first and second optically amplifying means are disposed in a mixed distribution, noises in outside bands can be suppressed effectively.

BRIEF DESCRIPTION OF THE DRAWINGS

FIG. 1 is a block diagram showing a general construction of an embodiment of the invention;

DESCRIPTION OF THE PREFERRED EMBODIMENTS

Explained below is an embodiment of the invention in detail with reference to the drawings.

FIG. 1 is a block diagram of a general construction of an embodiment of the invention.

Figure 4:
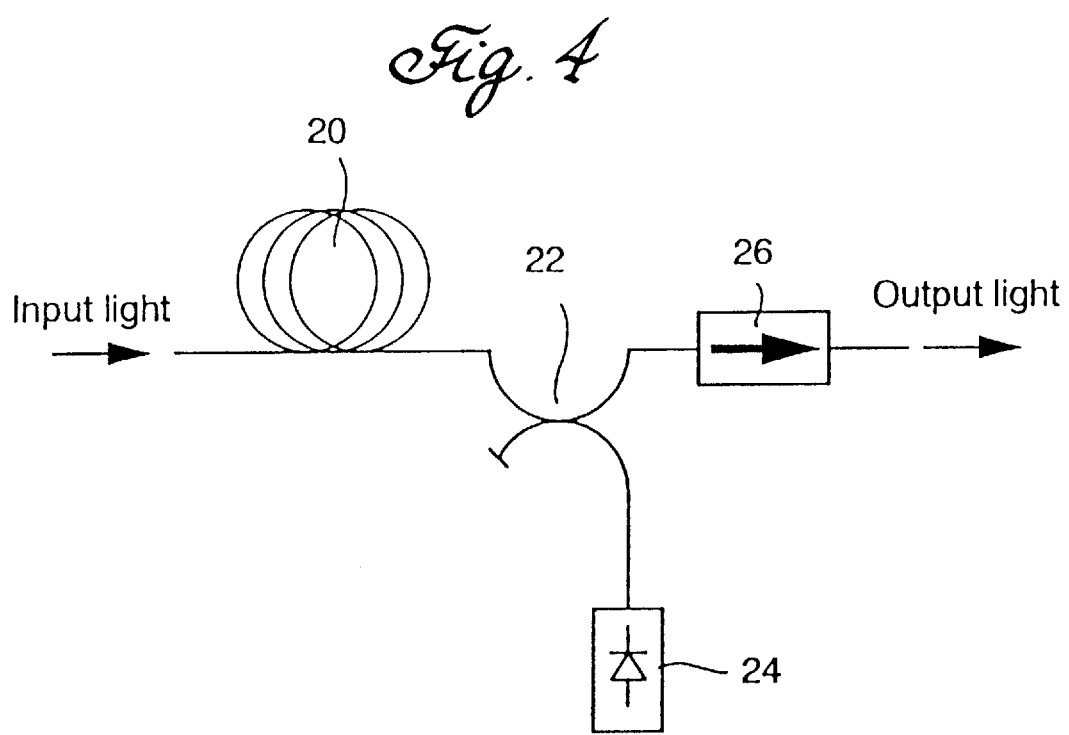
FIG. 4 is a block diagram showing a general construction of an optically amplifying repeater 16.

Numeral 40 denotes an optical transmitter terminal that transmits optical signals to an optical transmission line 42, and 44 denotes an optical receiver terminal that receives optical signals from the optical transmission line 42. In this embodiment, the optical transmission line 42 is divided into two sections 42a, 42b. In one section 42a, transmission optical fibers 46a are repeated by optically amplifying repeaters 48a having 7 m-long erbium-doped optical fibers. In the other section 42b, transmission optical fibers 46b are repeated by optically amplifying repeaters 48b having 10.8 m-long erbium-doped optical fibers. The optically amplifying repeaters 48a and 48b themselves have the same construction as that shown in FIG. 4. The transmission optical fibers 46a, 46b are absolutely identical in both construction and length.

As explained above, short erbium-doped optical fibers exhibit relatively flat gain wavelength characteristics in the band of 1,550 nm, but increase noises in the band of 1,530 nm. In contrast, long erbium-doped optical fibers decrease noises in the band of 1,530 nm, but exhibit non-flat gain wavelength characteristics acutely cresting in the band of 1,550 nm.

Although short erbium-doped fibers are advantageous from the standpoint of increasing the band width, since noises increase in the band of 1,530 nm, it is difficult to ensure an acceptable signal gain and a long-distance transmission. Taking it into account, the present invention suppress noises in the band of 1,530 nm by repeating the transmission optical fibers 46b in a section of the transmission line (section 42b in FIG. 1) by the optically amplifying repeaters 48b having long erbium-doped optical fibers.

In the optical transmission line 42, when contribution of the optically amplifying repeaters 48b in the transmission section 42b becomes larger than contribution of the optically amplifying repeaters 48a in the transmission section 42a, noises in the band of 1,530 nm can be decreased sufficiently, but the gain wavelength characteristics in the significant band of 1,550 nm become unacceptably acute. Therefore, contribution of the optically amplifying repeaters 48b must be less than that of the optically amplifying repeaters 48a. That is, it is important that the optical transmission line 42 includes more optically amplifying repeaters 48a than optically amplifying repeaters 48b.

This embodiment selects 33 km as the length of individual transmission optical fibers 46a and 46b, i.e. The repeating distance, and repeats the section 42a at 30 points and the section 42b at 10 points. This aspect of the system proved to be good as a result of an experiment.

Figure 2A:
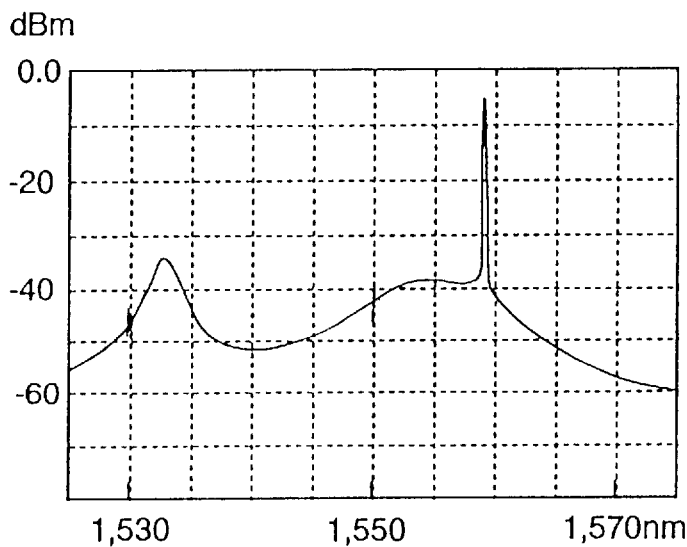
FIG. 2 is diagrams showing gain wavelength characteristics of transmission sections 42a, 42b and of the entire optical transmission line 42 in the embodiment of the invention.

FIG. 2(a) shows gain wavelength characteristics of the transmission line after thirty optically amplifying repeaters using 7 m-long erbium-doped optical fibers. That is, this is gain wavelength characteristics in the extent of the transmission section 42a. Although the characteristics remain relatively flat in the band of 1,550 nm, there is a great accumulation of noises in the band of 1,530 nm. If repeating is continued in this status, the gain in the band of 1,550 nm will decrease largely due to the accumulated noises in the band of 1,530 nm.

Figure 2B:
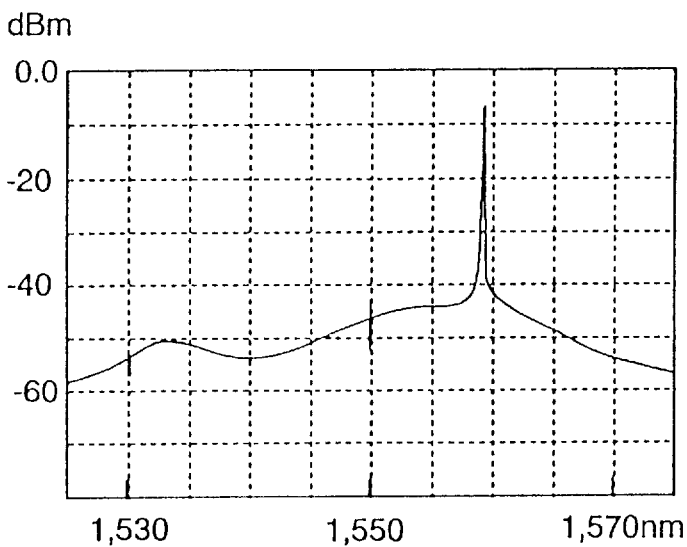

FIG. 2(b) shows gain wavelength characteristics after ten optically amplifying repeaters having 10.8 m-long erbium-doped optical fibers. That is, this is gain wavelength characteristics in the extent of the transmission section 42b. Although accumulation of noises in the band of 1,530 nm is small, gain wavelength characteristics in the band of 1,550 nm exhibit a less flatness as compared with that of FIG. 2(a) even though the repeating points are only ten. If repeating is continued in this status, gain wavelength characteristics will become more acute in the band of 1,550 nm.

Figure 2C:
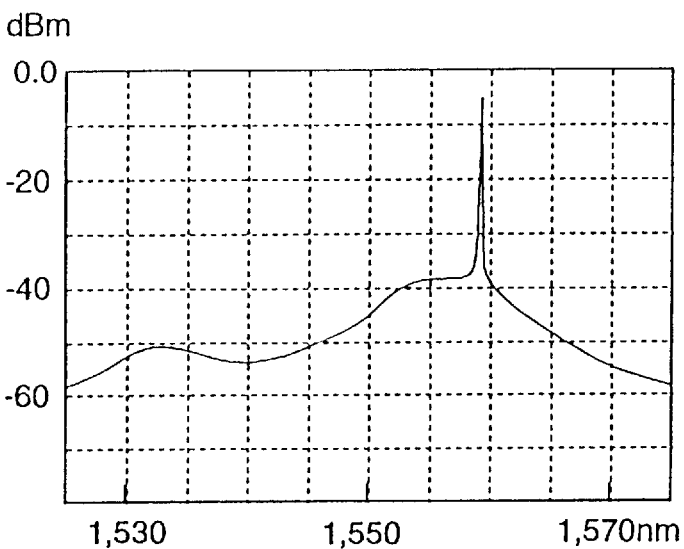
Figure 3:
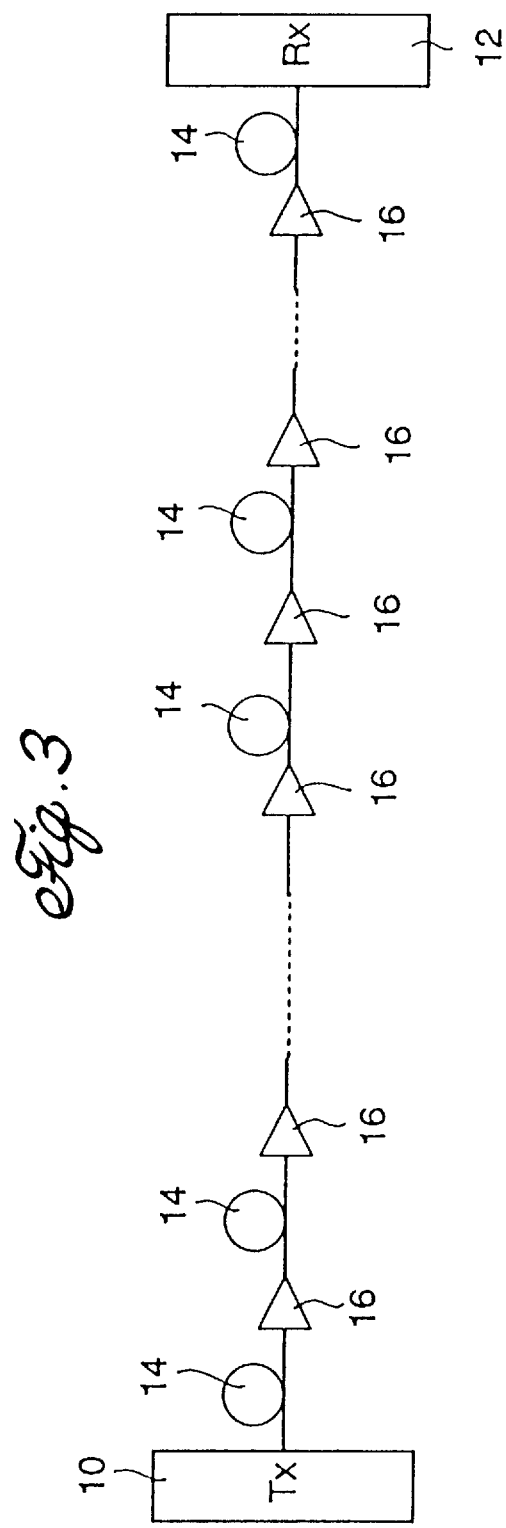
FIG. 3 is a block diagram showing a general construction of a conventional system.

FIG. 2(c) shows gain wavelength characteristics obtained by the present invention. That is, this is gain wavelength characteristics realized by both transmission sections 42a and 42b. Gain wavelength characteristics in the band of 1,550 nm remain relatively flat, and noises in the band of 1,530 nm are sufficiently suppressed. Even with repeaters as many as forty as a whole, good gain wavelength characteristics are obtained.

Note here that sharp peaks at a wavelength just below 1,560 nm in FIGS. 2(a), 2(b) and 2(c) are those of optical signals by test transmission.

When the lengths of the transmission optical fibers 46a and 46b are identical, the use of more repeaters 48a than the repeaters 48b means, apparently, that the transmission section 42a is longer than the transmission section 42b.

For simplicity, the above embodiment has been explained as collectively localizing optically amplifying repeaters 48a and 48b different in length of the erbium-doped optical fibers in sections 42a and 42b, respectively. However, it will be apparent that these optically amplifying repeaters 48a and 48a may be distributed in a mixed distribution along the entire optical transmission line 42. Local arrangement of the optically amplifying repeaters 48a and 48b in sections 42a and 42b gives the merit of easy maintenance. On the other hand, mixed arrangement of the optically amplifying repeaters 48a and 48b along the entire optical transmission line 42 contributes to early and frequent suppression of noises in the band of 1,530 nm, and promises a high noise suppressing effect.

The length, 7 m and 10.8 m, of erbium-doped optical fibers are only examples, and the invention is not restricted to this combination of lengths. Appropriate lengths vary with various factors, such as dopant and composition of glass.

The erbium-doped optical fiber is a kind of rare earth doped optical fibers. Other optical fibers doped with rare earth ions of any other rare earth other erbium, such as neodymium, praseodymium, may be used to form the optically amplifying repeaters 48a and 48b in the present invention. Additionally, optical fibers of the optically amplifying repeaters 48a and 48b may be doped with ions of different rare earth materials from each other.

The erbium-doped optical fiber is a medium that absorbs light in the optically unexcited state. Its absorption loss is proportional to the fiber length. Therefore, a long fiber length of the erbium-doped optical fiber means a large absorption loss. Whether the erbium-doped optical fiber is long or short directly corresponds to whether the absorption loss in the signal band is large or small. That is, the longer the erbium-doped optical fiber, the larger the absorption loss in the signal band. The shorter the fiber length, the smaller the absorption loss in the signal band. This relationship commonly applies not only to optical fiber amplifiers doped with other rare earth materials but alto to other optically excited optically amplifying elements.

As readily understood from the above description, the invention can realize relatively flat gain wavelength characteristics in the signal band and can make use of a wider signal band when taking the number of repeaters into account. Moreover, since noises in bands other than the signal band do not increase so much, a large signal gain is ensured, and the transmission distance can be elongated.

What is claimed is:

1. An optically amplifying transmission system comprising:
    a plurality of transmission optical fibers for transmitting an optical signal;
    a plurality of first optically amplifying fibers for repeating said transmission optical fibers and for amplifying said optical signal; and
    at least one second optically amplifying fiber for repeating said transmission optical fibers and for amplifying said optical signal, said first optically amplifying fibers having a fiber length longer than the fiber length of said at least one second optically amplifying fiber, said first optically amplifying fibers being greater in number than said at least one second optically amplifying fiber.

2. The optically amplifying transmission system according to claim 1 wherein said first and second optically amplifying fibers comprise rare earth doped optically amplifying fibers.

3. The optically amplifying transmission system according to claim 1 further comprising optical sending means for outputting said optical signal; and optical receiver means for receiving said optical signal.

4. An optically amplifying transmission system comprising:
    a plurality of transmission optical fibers for transmitting an optical signal;
    at least one first optically amplifying means for repeating said transmission optical fibers and for amplifying said optical signal with first optically amplifying characteristics; and
    at least one second optically amplifying means for repeating said transmission optical fibers and for amplifying said optical signal with second optically amplifying characteristics, said first optically amplifying characteristics having relatively flat gain wavelength characteristics in a predetermined signal band, and said second optically amplifying characteristics having a higher signal gain and unevener gain wavelength characteristics in said predetermined signal band than those of said first optically amplifying characteristics.

5. The optically amplifying transmission system according to claim 4 wherein said first and second optically amplifying means comprise rare earth doped optically amplifying fibers.

6. The optically amplifying transmission system according to claim 4 wherein said predetermined signal band includes the band of 1,550 nm.

7. The optically amplifying transmission system according to claim 4 further comprising optical sending means for outputting said optical signal; and optical receiver means for receiving said optical signal.

8. An optically amplifying transmission system comprising:
    a plurality of transmission optical fibers for transmitting an optical signal;
    at least one first optically amplifying means for repeating said transmission optical fibers and for amplifying said optical signal; and
    at least one second optically amplifying means for repeating said transmission optical fibers and for amplifying said optical signal, the absorption loss of said first optically amplifying means in a predetermined signal band being less than that of said second optically amplifying means in said predetermined signal band, and said first optically amplifying means being greater in number than said second optical amplifying means.

9. The optically amplifying transmission system according to claim 8 wherein said first and second optically amplifying means comprise rare earth doped optically amplifying fibers.

10. The optically amplifying transmission system according to claim 8 wherein said predetermined signal band includes the band of 1,550 nm.

11. The optically amplifying transmission system according to claim 8 further comprising optical sending means for outputting said optical signal; and optical receiver means for receiving said optical signal.

12. An optically amplifying transmission system for transmitting an optical signal, comprising:
    a plurality of first optically amplifying fibers for amplifying said optical signal;
    at least one second optically amplifying fiber for amplifying said optical signal, each of said first optically amplifying fibers having a fiber length longer than a fiber length of each of said at least one second optically amplifying fiber, said first optically amplifying fibers being greater in number than said at least one second optically amplifying fiber; and
    a plurality of transmission optical fibers for coupling said optical signal to each of said first and second optically amplifying fibers.

13. The optically amplifying transmission system according to claim 12 wherein said first and second optically amplifying fibers each comprise rare earth doped optically amplifying fibers.

14. The optically amplifying transmission system according to claim 12 further comprising optical transmitting means for outputting said optical signal; and optical receiver means for receiving said optical signal.

15. An optically amplifying transmission system for transmitting an optical signal, comprising:
    first optically amplifying means for amplifying said optical signal with first optically amplifying characteristics in a predetermined signal band;
    second optically amplifying means for amplifying said optical signal with second optically amplifying characteristics in said predetermined band, said first optically amplifying characteristics having a flatter gain wavelength characteristic and a smaller signal gain than said second optically amplifying characteristics; and
    a plurality of transmission optical fibers for coupling said optical signal to each of said first and second optically amplifying means.

16. The optically amplifying transmission system according to claim 15 wherein said first and second optically amplifying means each comprise rare earth doped optically amplifying fibers.

17. The optically amplifying transmission system according to claim 15 wherein said predetermined signal band includes 1,550 nm.

18. The optically amplifying transmission system according to claim 15 further comprising optical transmitting means for outputting said optical signal; and optical receiver means for receiving said optical signal.

19. An optically amplifying transmission system for transmitting an optical signal, comprising:

a plurality of first optically amplifying fibers for amplifying said optical signal;

at least one second optically amplifying fiber for amplifying said optical signal, each of the first optically amplifying fibers having an absorption loss in a predetermined signal band less than that of each of said at least one second optically amplifying fiber in said predetermined signal band, and said first optically amplifying fibers being greater in number than said at least one second optically amplifying fiber; and a plurality of transmission optical fibers for coupling said optical signal to each of said first and second optically amplifying fibers.

20. The optically amplifying transmission system according to claim 19 wherein said first and second optically amplifying fibers each comprise rare earth doped optically amplifying fibers.

21. The optically amplifying transmission system according to claim 19 wherein said predetermined signal band includes 1,550 nm.

22. The optically amplifying transmission system according to claim 19 further comprising optical transmitting means for outputting said optical signal; and optical receiver means for receiving said optical signal.

* * * * *

UNITED STATES PATENT AND TRADEMARK OFFICE
CERTIFICATE OF CORRECTION

Figure 5A:
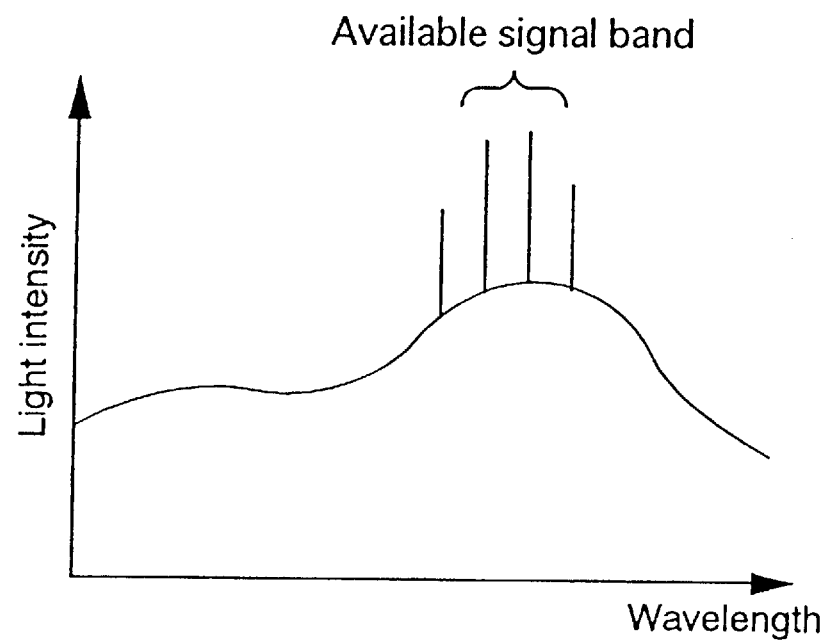
FIG. 5 is comparative diagrams of gain wavelength characteristics of a multi-repeat transmission system.
Figure 5B:
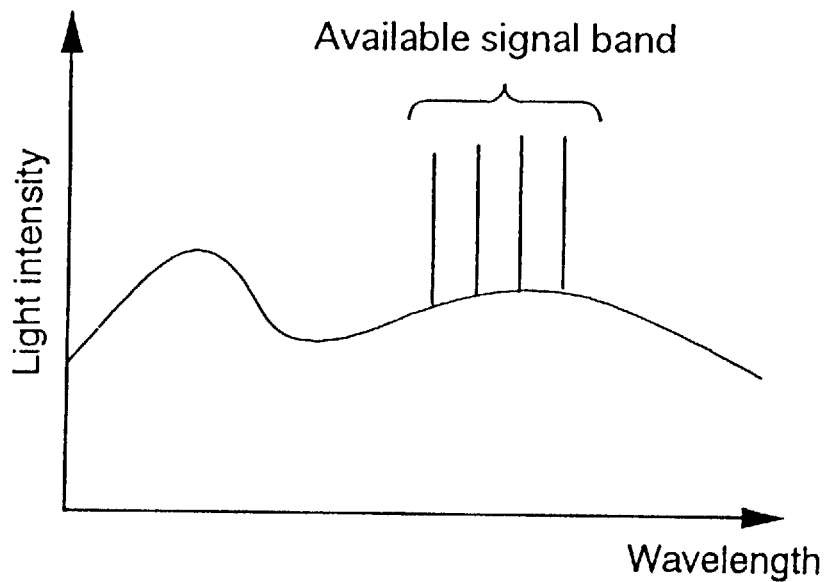

PATENT NO. : 5,808,789
DATED : September 15, 1998
INVENTOR(S) : Noboru Edagawa; Hidenori Taga; Masatoshi Suzuki; Itsuro Morita; Shu Yammamoto; Shigeyuki Akiba It is certified that error appears in the above-identified patent and that said Letters Patent is hereby corrected as shown below:

On the title page, Abstract, line 9, replace "46a an 46b" with -- 46a and 46b --.
Column 1, line 16, replace "14, .... Of" with -- 14, ... of --.
Column 1, line 17, replace "16, .... To" with -- 16, ... to --.
Column 1, line 21, replace "having a less" with -- having less --.
Column 1, line 24, replace "i.e. High" with -- i.e., high --.
Column 1, line 33, after "repeater" insert -- 16. A laser beam --.
Column 1, line 38, replace "later the stages" with -- later stages --.
Column 1, line 55, replace "cause an increase" with -- cause increased --.
Column 2, line 37, replace "such the optically" with -- such optically --.
Column 2, line 57, replace "FIG. 2 is" with -- FIGS. 2a, 2b, and 2c are --.
Column 2, line 66, replace "FIG. 5 is" with -- FIGS. 5a and 5b are --.
Column 3, lines 34,35, replace "suppress" with -- suppresses --.
Column 3, line 52, replace "i.e. The" with -- i.e., the --.
Column 4, line 29, replace "48a and 48a" with -- 48a and 48b --.
Column 4, line 46, after "rare earth" delete "other".

UNITED STATES PATENT AND TRADEMARK OFFICE
CERTIFICATE OF CORRECTION

PATENT NO. : 5,808,789
DATED : September 15, 1998
INVENTOR(S) : Noboru Edagawa; Hidenori Taga; Masatoshi Suzuki; Itsuro Morita; Shu Yammamoto; Shigeyuki Akiba It is certified that error appears in the above-identified patent and that said Letters Patent is hereby corrected as shown below:

Column 4, line 63, replace "alto" with -- also --.
Column 5, line 44, replace "unevener" with -- uneven --.

Signed and Sealed this

Eighteenth Day of April, 2000

*Attest:*

Q. TODD DICKINSON

*Attesting Officer*      *Director of Patents and Trademarks*